United States Patent
Weber et al.

(10) Patent No.: US 11,993,101 B2
(45) Date of Patent: May 28, 2024

(54) VEHICLE PNEUMATIC TYRE AND RUBBER MIXTURE FOR A TREAD

(71) Applicant: Continental Reifen Deutschland GmbH, Hannover (DE)

(72) Inventors: Christian Weber, Garbsen (DE); Norbert Müller, Nienhagen (DE); Pedro-Nuno Rodrigues, Isernhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 620 days.

(21) Appl. No.: 17/262,298

(22) PCT Filed: Jul. 8, 2019

(86) PCT No.: PCT/EP2019/068202
§ 371 (c)(1),
(2) Date: Jan. 22, 2021

(87) PCT Pub. No.: WO2020/030354
PCT Pub. Date: Feb. 13, 2020

(65) Prior Publication Data
US 2021/0252916 A1    Aug. 19, 2021

(30) Foreign Application Priority Data

Aug. 10, 2018   (DE) ............... 10 2018 213 472.3

(51) Int. Cl.
| | | |
|---|---|---|
| *B60C 11/00* | (2006.01) | |
| *B60C 1/00* | (2006.01) | |
| *B60C 11/03* | (2006.01) | |
| *B60C 11/12* | (2006.01) | |
| *C08K 3/06* | (2006.01) | |
| *C08K 3/36* | (2006.01) | |
| *C08K 5/548* | (2006.01) | |
| *C08L 9/06* | (2006.01) | |
| *B29D 30/52* | (2006.01) | |

(52) U.S. Cl.
CPC ........ *B60C 11/0306* (2013.01); *B60C 1/0016* (2013.01); *B60C 11/0008* (2013.01); *C08K 3/06* (2013.01); *C08K 3/36* (2013.01); *C08K 5/548* (2013.01); *C08L 9/06* (2013.01); *B29D 30/52* (2013.01); *B60C 2011/0016* (2013.01); *B60C 2011/0025* (2013.01); *B60C 2011/0033* (2013.01); *B60C 2011/0355* (2013.01); *B60C 2011/129* (2013.01); *C08L 2205/02* (2013.01)

(58) Field of Classification Search
CPC ........... B60C 1/0016; B60C 2011/0355; B60C 2011/0016; B60C 2011/0025; B29D 30/52
See application file for complete search history.

(56) References Cited

U.S. PATENT DOCUMENTS

| | | | | |
|---|---|---|---|---|
| 5,370,167 | A * | 12/1994 | Kogure .................... | B60C 9/18 152/537 |
| 2004/0181004 | A1 * | 9/2004 | Sandstrom ............. | B29B 7/183 524/495 |
| 2007/0017617 | A1 | 1/2007 | Lafrique et al. | |
| 2010/0230021 | A1 | 4/2010 | Merino Lopez | |
| 2011/0056601 | A1 * | 3/2011 | Ebiko ................. | B60C 15/0018 152/209.16 |
| 2012/0160383 | A1 * | 6/2012 | De Barsy ............ | B60C 11/1272 152/209.18 |
| 2012/0289647 | A1 | 11/2012 | Koelle et al. | |
| 2013/0048169 | A1 | 2/2013 | Erceg | |
| 2016/0159157 | A1 * | 6/2016 | Jacoby .................. | B60C 1/0016 152/450 |
| 2018/0100058 | A1 * | 4/2018 | Pavon Sierra .......... | C08K 3/36 |

FOREIGN PATENT DOCUMENTS

| | | |
|---|---|---|
| CN | 102762648 A | 10/2012 |
| DE | 102012108247 A1 | 5/2014 |
| EP | 1745946 A2 | 1/2007 |
| EP | 1990217 A1 | 11/2008 |
| EP | 2565056 A1 | 3/2013 |
| JP | 57-051504 A * | 3/1982 |
| WO | 2016087078 A1 | 6/2016 |
| WO | WO-2016/087078 A1 * | 6/2016 |
| WO | WO-2016/198177 A1 * | 12/2016 |
| WO | 2019102148 A1 | 5/2019 |

OTHER PUBLICATIONS

Machine translation for WO 2016/087078 (Year: 2023).*
Machine translation for Japan 57-051504 (Year: 2023).*
Chinese Office Action dated Mar. 23, 2022 of counterpart CN applicaton 201980051220.8.
International Search Report of PCT/EP2019/068202 on which this application is based on.

* cited by examiner

*Primary Examiner* — Steven D Maki
(74) *Attorney, Agent, or Firm* — Richard A. Wolf; Gregory J. Adams

(57) ABSTRACT

A pneumatic vehicle tire in radial design that is a summer tire or all-season tire, with a profiled tread comprising rows of profile blocks and/or profile ribs running around the tire in circumferential direction, wherein the total number of sipes within each row of profile blocks and/or profile ribs is not more than 150, wherein the tread is in the form of a single layer or multiple layers with a radially outermost tread layer that extends at least over the width of the ground contact area, and wherein the profile depth of the tread is up to 6.5 mm. The tread or its radially outermost tread layer consists of a rubber material with a Shore A hardness at room temperature in accordance with DIN ISO 7619-1 of 40 ShA to 55 ShA.

14 Claims, No Drawings

VEHICLE PNEUMATIC TYRE AND RUBBER MIXTURE FOR A TREAD

The invention relates to a pneumatic vehicle tire in radial design that is a summer tire or all-season tire, with a profiled tread comprising rows of profile blocks and/or profile ribs running around the tire in circumferential direction, wherein the total number of sipes within each row of profile blocks and/or profile ribs is not more than 150, wherein the tread is in the form of a single layer or multiple layers with a radially outermost tread layer that extends at least over the width of the ground contact area, and wherein the profile depth of the tread is up to 6.5 mm.

Summer tires and all-season tires typically have treads having a profile depth of 6.5 mm to 8.5 mm. In recent times, the profile depth chosen for the treads of these tires has tended to become ever smaller in order to reduce rolling resistance. It has been found that the decrease in profile depth alters or influences the bending or deformation characteristics of the profile positive in a manner unfavorable for braking properties on dry and wet roads.

It is therefore an object of the invention, in a pneumatic vehicle tire of the type specified at the outset, to improve dry and wet braking properties.

The stated object is achieved according to the invention, whereby the tread or the radially outermost tread layer consists of a rubber material with a Shore A hardness at room temperature in accordance with DIN ISO 7619-1 of 40 ShA to 55 ShA.

The pneumatic vehicle tire of the invention—compared to the all-season and summer tires known to date—has a distinctly softer tread or a distinctly softer radially outermost tread layer in the tread. For summer and all-season tires, treads made of a rubber material having a Shore A hardness of 62 ShA to 68 ShA are customary and known, and these can be used to achieve good handling properties including, for example, response behavior to steering forces and the transmission of lateral forces to the road.

In the case of winter tires, by contrast, treads made of a rubber material having a Shore A hardness of 55 ShA to 65 ShA are customary; for example, DE 10 2012 108 247 A1 mentions a winter tire tread having a Shore A hardness of 50 ShA to 60 ShA. A tread made of a rubber material having a hardness of greater than 65 ShA in winter tires has an adverse effect on the desired "interdigitation effect" of the sipes typically formed in the profile positive of the tread. In treads for winter tires consisting of a rubber material having a hardness below 50 ShA, the profile positive segments formed by the sipes have a tendency to tilt as the tread rolls, which distinctly reduces the contact area of the tread with the road or with the base.

In the summer or all-season tire of the design of the invention, the unusually low Shore A hardness of the rubber material of the tread or of the radially outermost tread layer for this type of tire, together with the low profile depth of not more than 6.5 mm, brings about a distinct improvement in dry and wet braking properties, as also shown by test results (see table 3). More particularly, a pneumatic vehicle tire of the invention thus overcomes the prevailing prejudice in the art that "soft" treads exhibit poor handling properties. This is because it is possible to achieve very good handling properties in summer tires and all-season tires with soft treads, on account of the small number of sipes in combination with the low profile depth of up to 6.5 mm.

In a preferred execution variant, the Shore A hardness at room temperature in accordance with DIN ISO 7619-1 of the rubber material of the tread or of the radially outermost tread layer is not more than 52 ShA, especially up to 50 ShA. It is possible to achieve even better dry braking properties in these preferred hardness ranges (see test results in table 3).

In a further preferred execution variant, the rubber material of the tread or of the radially outermost tread layer has a dynamic storage modulus at 8% elongation and 55° C. in accordance with DIN 53 513, ascertained by dynamic-mechanical measurement with a strain sweep, of 2.5 MPa to 4.5 MPa, especially of not more than 4.0 MPa, and preferably of not more than 3.6 MPa. This storage modulus, similarly to Shore A hardness, is a measure of the stiffness of the rubber material.

The effects described are apparent particularly when the profile depth of the tread is not more than 6.0 mm, especially not more than 5.5 mm. A tire with such a small profile depth additionally exhibits particularly low rolling resistance.

With regard to water uptake and water drainage capacity of the tread, it is advantageous when the profile depth of the tread is at least 4.5 mm, especially at least 5.0 mm.

The invention further relates to a rubber mixture for a single-layer tread or for a radially outermost layer of a multilayer tread for a pneumatic vehicle tire of the invention, which rubber mixture is characterized in that it comprises the following:
a rubber having a glass transition temperature of lower than −35° ° C. or
a mixture of at least two rubbers having an average glass transition temperature of lower than −35° C.,
30 phr to 250 phr of silica (s),
5.0 phr to 70 phr of liquid polymer (s),
5.0 phr to 75 phr of resin (s),
3.0 phr to 25.0 phr of activator (s),
0.5 phr to 6.0 phr of accelerator (s),
0.5 phr to 5.0 phr of sulfur or a sulfur donor.

Further preferred ranges of amount and specific mixture constituents of the rubber mixture contribute to controlled variability of the tire properties within the desired ranges and/or matching thereof to the respective tire or tread profile thereof in this way. It is advantageous here when the rubber mixture comprises the following:
rubber having a glass transition temperature of lower than −55° C. or
a mixture of at least two rubbers having an average glass transition temperature of lower than −55° C.,
50 phr to 100 phr of styrene-butadiene rubber (s), especially modified solution SBR, and/or
60 phr to 150 phr of silica (s) and/or
10 phr to 50 phr of liquid polymer (s), preferably including at least liquid polybutadiene, and/or
10 phr to 50 phr of resin (s) and/or
at least one blocked and/or unblocked mercaptosilane as activator(s), especially 5.0 phr to 15.0 phr, preferably 7.0 phr of 13.0 phr, of blocked and/or unblocked mercaptosilane (s).

Further features, advantages and details of the invention will now be elucidated in detail by the description that follows.

The invention relates to a pneumatic vehicle tire in radial design that is a summer or all-season tire for passenger vehicles, vans or light trucks.

The tread profile of summer tires and all-season tires differs from the tread profile of winter tires in a known manner, particularly by the number of sipes formed in the profile positive of the tread, i.e. in its sipe density.

What is understood by a "sipe" in the context of the present invention is a narrow groove formed in a profile positive that extends at an angle that varies from perpendicular direction by up to 45° in top view, and has a depth in radial direction of at least 2.0 mm, a width at the tread periphery of 0.4 mm to 1.0 mm, especially of up to 0.8 mm, and a longitudinal extent, ascertained at the center line in the direction of extension, of at least 8.0 mm. Very short sipes, as frequently exist in sharp-angled edge regions of profile positives, are therefore not taken into account in ascertaining the sipe density.

In order to ascertain the sipe density, the number of successive sipes in circumferential direction in a profile positive of the tread running in circumferential direction is considered. A "profile positive running in circumferential direction" here is a profile positive either divided into profile blocks in a known manner by transverse or oblique grooves (typically called profile block rows) or structured with transverse or oblique grooves or incisions that end in its interior in the manner of dead-end grooves, especially in the manner of blocks or segments (typically called profile band or profile rib).

A summer or all-season tire—by contrast with winter tires—has, within each profile positive of the tread running in circumferential direction, not more than 150, especially not more than 130, sipes arranged or formed successively in circumferential direction.

The pneumatic vehicle tire of the invention also has a tread with at least one part of the tread made of a specific rubber material. The further components of the tire, which especially include a carcass inlay, a belt bandage, an inner layer and bead cores, may be executed in a known manner.

The tread has been provided with profiling comprising main grooves implemented to the envisaged profile depth, this being the maximum envisaged depth of grooves, especially circumferential grooves or oblique grooves, where the profile depth is 4.5 mm to 6.5 mm, especially not more than 6.0 mm, preferably 5.0 mm to 5.5 mm. In addition, the tread may be provided with transverse grooves, sipes and the like, which are especially implemented in a known manner. The tread is a mono tread of single-layer structure, composed of a single rubber material, or a tread having a multilayer structure, especially two-layer structure, in radial direction. In the case of a tread of two-layer structure, the radially outermost layer in each case extends over the entire width of the tread or at least over the entire width of the ground contact area of the tread. The ground contact area corresponds here to the footprint ascertained under static conditions (ascertained with a tire mounted on a standard wheel rim, load at 70% of maximum load-bearing capacity, internal pressure 85% of standard pressure, according to ETRTO standards).

The rubber material of the mono tread or the radially outermost tread layer, as elucidated in detail further below, has particularly low Shore A hardness. In the case of a tread of multilayer structure, the thickness of the radially outermost rubber layer is preferably chosen in such a way that the profiling is formed completely within the radially outermost rubber layer.

Table 1 below contains examples A, B, C, D of compositions of rubber mixtures from which the rubber material of the tread or of the radially outermost tread layer is formed in the course of tire vulcanization. The amounts of the constituents of the rubber mixture are given in the unit phr (parts per hundred parts rubber) customary in rubber technology. The indications of quantities are based in each case on 100 parts by mass of the base polymer, or on each of the base polymers in the case of polymer blends. Also reported in table 1 is a composition for a reference mixture Ref. The liquid polybutadiene envisaged in examples C and D serves as plasticizer and does not count toward the base polymers.

TABLE 1

Recipes (compositions) of the rubber mixtures

| Recipe | Ref. | A | B | C | D |
|---|---|---|---|---|---|
| Natural rubber | 25.0 | | | | |
| Neodym BR (polybutadiene) | | 15.0 | 15.0 | 15.0 | 15.0 |
| Functionalized SSBR TG −25° C. | 75.0 | 85.0 | 85.0 | 85.0 | 85.0 |
| N 339 carbon black | 5.0 | 5.0 | 7.0 | 7.0 | 7.0 |
| BET 160 silica | 82.0 | 65.0 | 65.0 | 65.0 | 75.0 |
| Liquid polybutadiene (plasticizer) | | | | 10.0 | 10.0 |
| Plasticizer oil | 5.0 | | | | |
| Alpha-methylstyrene resin | 6.0 | 23.0 | 33.0 | 33.0 | 33.0 |
| Aging inhibitor (DTPD, 6PPD, TMQ, ozone wax) | 7.0 | 7.0 | 7.0 | 7.0 | 7.0 |
| Zinc oxide (activator) | 2.0 | 2.0 | 2.0 | 2.0 | 2.0 |
| Stearic acid (activator) | 1.0 | 1.0 | 1.0 | 1.0 | 1.0 |
| Processing auxiliary | 6.0 | | | | |
| NXT silane[a] (activator) | 8.4 | 6.6 | 6.6 | 6.6 | 7.7 |
| Accelerator (MBT, TBzTD, DPG, TBBS) | 3.6 | 3.6 | 4.4 | 4.4 | 4.4 |
| Sulfur | 0.8 | 1.8 | 0.9 | 0.9 | 0.9 |

[a]NXT silane from Momentive Performance Materials Inc.

A rubber mixture intended for the tread or the radially outermost tread layer comprises:
 a rubber having a glass transition temperature ($T_g$) of <−35° C., especially of <−55° C., or
 a mixture of at least two rubbers having an averaged glass transition temperature ($T_g$)-based on the sum total of the masses of the rubbers—of <−35° C., especially of <−55° C.,
  preferably including 50 phr to 100 phr of styrene-butadiene rubber (s), especially functionalized (modified) S-SBR (solution SBR),
 30 phr to 250 phr, especially 60 phr to 150 phr, of silica (s),
 5.0 phr to 70 phr, especially 10 phr to 50 phr, of liquid polymer (s),
 preferably including at least liquid polybutadiene,
 5.0 phr to 75 phr, especially 10 phr to 50 phr, of resin (s),
 3.0 phr to 25.0 phr of activator (s),
 preferably including at least one blocked or unblocked mercaptosilane,
  where mercaptosilane (s) is/are especially present in an amount of 5.0 phr to 15.0 phr, preferably of 7.0 phr of 13.0 phr,
 0.5 phr to 6.0 phr, especially up to 4.0 phr, of accelerator (s) and
 0.5 phr to 5.0 phr of at least one sulfur or sulfur donor.

The functionalized S-SBR, in a known manner, has functional groups at the chain ends of its rubber molecules that can enter into a chemical bond with silica.

In rubber mixtures of the invention, it is possible to use unblocked mercaptosilanes and/or blocked mercaptosilanes, for example NXT silane, NXTlow VOC, NXT-Z45, NXT- Z60, NXT-Z100 (from Momentive Performance Materials INC.) or SI363 (from Evonik Industries AG).

The rubber mixtures specified in table 1 were produced as elucidated below, and vulcanizates produced from these rubber mixtures were tested as likewise elucidated below.

The rubber mixtures were produced by the method customary in the rubber industry under customary conditions in two mixing stages in a mixing unit. In the first mixing stage (base mixing stage), all constituents of the respective rubber mixture except for sulfur and accelerator (s) were mixed at a mixing temperature of 145° ° C. to 185° ° C., target temperature of 150° ° C. to 175° C., for a period of 200 to 600 seconds. In the second mixing stage (finish mixing stage), sulfur and accelerator were added to the rubber mixture obtained in the first mixing stage and the finished rubber mixture was produced in this way, with mixing in the second mixing stage at a mixing temperature of 90° ° C. to 120° ° C. for a period of 180 to 300 seconds.

All rubber mixtures were used to produce standardized test specimens by vulcanization, and these test specimens were used to determine some typical vulcanizate properties. The following tests were conducted:

Shore A hardness at room temperature (25° C.) according to DIN ISO 7619-1,

Resilience at room temperature (25° C.) according to DIN 53 512,

Resilience at 70° C. according to DIN 53 512,

Tensile test at room temperature (25° C.) according to DIN 53 504,

Dynamic storage modulus at 0.15% elongation ($E'_{0.154}$) and at 8% elongation ($E'8\%$) and maximum loss factor (tan $d_{max}$) at 55° C. from dynamic-mechanical measurement according to DIN 53 513, strain sweep.

These vulcanizate properties permit conclusions to be drawn as to the properties to be expected from a tread manufactured from such a rubber mixture or a radially outermost tread layer manufactured from such a rubber mixture.

Resilience at room temperature can be used here as an indicator of braking properties of the pneumatic vehicle tire on a wet road (wet braking properties). Resilience at room temperature is a measure of damping; the lower the resilience, the higher the damping. In the case of relatively low resilience (relatively high damping) of the rubber material that comes into contact with the ground as the tire rolls, more energy is "destroyed", which improves the braking properties of the tire.

Resilience at 70° C. serves as an indicator of the rolling resistance of the tire, with high resilience meaning low rolling resistance.

Maximum loss factor (tan $d_{max}$) is a further indicator of the rolling resistance of the tread, with treads made of a rubber material with a relatively low loss factor having relatively low damping, such that tires comprising such treads show low rolling resistance.

Shore A hardness and dynamic storage modulus are especially each a measure of the stiffness of the vulcanizates.

Table 2 collates results of the tests of vulcanizate properties.

TABLE 2

Results of the tests of vulcanizate properties

| | | Unit | Ref. | A | B | C | D |
|---|---|---|---|---|---|---|---|
| Shore hardness | Shore A hardness at room temperature | ShA | 68.2 | 53.8 | 51.2 | 52.4 | 49.1 |
| Rebound | Resilience at room temperature | % | 26.3 | 17.7 | 14.6 | 16.8 | 16.9 |
| | Resilience at 70° C. | % | 57.8 | 63.4 | 62.1 | 61.2 | 57.4 |
| Eplexor | $E'_{0.15\%}$ | MPa | 11.8 | 5.4 | 4.6 | 4.5 | 4.3 |
| | $E'_{8\%}$ | MPa | 6.0 | 4.4 | 3.8 | 3.9 | 3.5 |
| | tan $d_{max}$ | — | 10.152 | 0.114 | 0.114 | 0.113 | 0.134 |

The rubber material of the tread or of the radially outermost tread layer has a Shore A hardness at room temperature of 40 ShA (Shore A) to 55 ShA, especially of up to 52 ShA, preferably of up to 50 ShA, and more preferably of not more than 49 ShA. In addition, the rubber material of the tread or of the radially outermost tread layer has a dynamic storage modulus at 8% elongation and 55° C. ($E'8\%$) of 2.5 MPa to 4.5 MPa, especially of not more than 4.0 MPa, and more preferably of not more than 3.6 MPa.

Tires of dimensions 205/55 R 16 were produced with a single-layer tread with a profile customary for summer tires, with the tread manufactured from the rubber mixtures Ref, A, B, C or D. The profile depth for all tires was 6.0 mm. The wet braking properties and dry braking properties of the tires were tested. The test conditions were as follows:

Test for Dry Braking
Vehicle: Golf 7
Air temperature: 20° C. to 21° C.
Road: Wet asphalt with high coefficient of friction (coefficient of friction of the reference tire 0.812);
  Wet asphalt with low coefficient of friction (coefficient of friction of the reference tire 0.642);
Road temperature: 20° C.
Test for Wet Braking:
Vehicle: Golf 7
Air temperature: 24° C.
Road: Dry asphalt
  (Coefficient of friction of the reference tire: 1.041)
Road temperature: 20° ° C. to 21° ° C.

Table 3 contains the results of the tire tests, with the values for the reference tires with the tread made of rubber mixture Ref. fixed at 100.0. Values greater than 100 indicate an improvement in the respective tire property over the reference tire.

TABLE 3

Results of the tire tests and Shore A hardness of the rubber material of the tread

| | | Ref. | A | B | C | D |
|---|---|---|---|---|---|---|
| Hardness at room temperature | ShA | 68.2 | 53.8 | 51.2 | 52.4 | 49.1 |
| Resilience at room temperature | % | 26.3 | 17.7 | 14.6 | 16.8 | 16.9 |
| $E'_{0.15\%}$ | MPa | 11.8 | 5.4 | 4.6 | 4.5 | 4.3 |
| $E'_{8\%}$ | MPa | 6.0 | 4.4 | 3.8 | 3.9 | 3.5 |
| Wet braking | — | 100.0 | 101.0 | 101.4 | 100.7 | 105.7 |
| Dry braking | — | 100.0 | 103.7 | 104.7 | 103.9 | 106.0 |

According to table 3, the tires with a tread manufactured from one of rubber mixtures A, B, C, D show improved wet braking and dry braking properties. It can be assumed that this improvement is attributable mainly to the lower hardness of the vulcanizates of rubber mixtures A, B, C, D compared to the vulcanizate of rubber mixture Ref. A tread having lower hardness should influence the size and shape of the contact area between the tread and the road in a manner advantageous for braking properties. However, this is found to be the case only for treads having relatively low sipe density and therefore sufficiently large profile positive segments, i.e. in the case of treads having correspondingly high "mechanical stiffness". This is the case for tread profiles of summer tires and for all-season tires.

With regard to improved wet braking properties, it is suspected that low resilience at room temperature additionally also makes a contribution.

The invention claimed is:

1. A method of preparing a rubber mixture comprising:
a first mixing stage for mixing first constituents comprised of:
  a rubber having a glass transition temperature ($T_g$) of lower than −35° C. or a mixture of at least two rubbers having an average glass transition temperature ($T_g$) of lower than −35° C.;
  30 phr to 250 phr of silica(s);
  5.0 phr to 70 phr of liquid polymer(s);
  5.0 phr to 75 phr of resin(s);
  3.0 phr to 25.0 phr of activator(s);
a second mixing stage wherein 0.5 phr to 6.0 phr of accelerator(s) and 0.5 phr to 5.0 phr of sulfur or a sulfur donor are mixed with the first constituents after the first mixing stage;
wherein in the first mixing stage the first constituents are mixed at a mixing temperature of from 145° C. to 185° C. for a period of from 200 to 600 seconds; and,
wherein the second mixing stage has a mixing temperature of from 90° C. to 120° C. for a period of from 180 to 300 seconds;
wherein the rubber mixture is incorporated in a single-layer tread or in a radially outermost layer of a multi-layer tread of a pneumatic vehicle tire in radial design that is a summer tire or all-season tire, with a profiled tread comprising rows of profile blocks and/or profile ribs running around the tire in circumferential direction, wherein the total number of sipes within each row of profile blocks and/or profile ribs is not more than 150;
wherein the tread is in the form of a single layer or multiple layers with a radially outermost tread layer that extends at least over the width of a ground contact area;
wherein a profile depth of the tread is up to 6.5 mm; and,
wherein the tread or its radially outermost tread layer consists of the rubber mixture with a Shore A hardness at room temperature in accordance with DIN ISO 7619-1 of 40 ShA to 55 ShA.

2. The method as claimed in claim 1, wherein the Shore A hardness at room temperature in accordance with DIN ISO 7619-1 of the rubber mixture of the tread or of the radially outermost tread layer is not more than 50 ShA.

3. The method as claimed in claim 1, wherein the rubber mixture of the tread or of the radially outermost tread layer has a dynamic storage modulus at 8% elongation and 55° C. (($E'_{8\%}$) in accordance with DIN 53 513, ascertained by dynamic-mechanical measurement with a strain sweep, of 2.5 MPa to 4.0 MPa.

4. The method as claimed in claim 1, wherein the profile depth of the tread is not more than 6.0 mm.

5. The method as claimed in claim 1, wherein the profile depth of the tread is at least 4.5 mm.

6. The method as claimed in claim 1, wherein the first constituents comprise from 10 phr to 50 phr of the resin(s).

7. The method as claimed in claim 1, wherein the rubber has a glass transition temperature ($T_g$) of lower than −55° C. or a mixture of at least two rubbers has an average glass transition temperature ($T_g$) of lower than −55° C.

8. The method as claimed in claim 1, wherein the first constituents comprise at least one blocked and/or unblocked mercaptosilane as the activator(s).

9. The method as claimed in claim 8, wherein the first constituents comprise a total of 7.0 phr to 13.0 phr of the blocked and/or unblocked mercaptosilane.

10. The method as claimed in claim 1, wherein the first constituents comprise 50 phr to 100 phr of modified solution styrene-butadiene rubber.

11. The method as claimed in claim 1, wherein the first constituents comprise 60 phr to 150 phr of the silica.

12. The method as claimed in a claim 1, wherein the liquid polymer(s) of the first constituents comprise 10 phr to 50 phr of at least liquid polybutadiene.

13. The method as claimed in a claim 1, wherein the rubber mixture is devoid of plasticizer oil.

14. The method as claimed in a claim 1, wherein the liquid polymer(s) include polybutadiene which is the only plasticizer in the rubber mixture.

* * * * *